United States Patent [19]

Whitney et al.

[11] 4,439,926
[45] Apr. 3, 1984

[54] TRANSFERRABLE-CENTER COMPLIANCE SYSTEM

[75] Inventors: Daniel E. Whitney, Arlington; Thomas L. De Fazio, Watertown, both of Mass.

[73] Assignee: The Charles Stark Draper Laboratory, Inc., Cambridge, Mass.

[21] Appl. No.: 366,093

[22] Filed: Apr. 6, 1982

[51] Int. Cl.³ .............................................. G01B 5/25
[52] U.S. Cl. ................................. 33/185 R; 33/169 C
[58] Field of Search .................. 33/169 C, 185 R, 189, 33/172 D; 403/53; 29/406, 407

[56] References Cited

U.S. PATENT DOCUMENTS

4,283,153 8/1981 Brendamour ................. 33/169 C X
4,355,469 10/1982 Nevins et al. ................. 33/169 C X
4,367,591 1/1983 Hirabayashi et al. ............. 33/169 C Primary Examiner—Harry N. Haroian
Attorney, Agent, or Firm—Joseph S. Iandiorio

[57] ABSTRACT

A transferrable-center compliance system including a remote center compliance (RCC) device being erectable by an axial load in a first range, for establishing a remote center of compliance at, near, or beyond the free end of an operator member; and pliant support means for supporting the RCC device when the RCC device is collapsed by an axial load outside the first range, and for yielding to the RCC device when it is erected with the first remote center of compliance at, near, or beyond the free end of the operator member.

42 Claims, 15 Drawing Figures

TRANSFERRABLE-CENTER COMPLIANCE SYSTEM

FIELD OF INVENTION

This invention relates to a transferrable-center compliance system and more particularly to such a system having in one condition a remote center of compliance at, near or beyond the operator member of a remote center compliance (RCC) device, and in another condition having a center of motion which is removed from the remote center of compliance, or multiple or indeterminate centers of motion.

BACKGROUND OF INVENTION

A remote center compliance (RCC) device is a passive device for aiding insertion and mating maneuvers in robot machines, docking and assembly equipment. An RCC establishes motion about a remote center of compliance typically at, near or beyond the functioning end of the operator member. The RCC includes two structures concatenated or serially interconnected between the operator member and a mounting member. In one type of RCC, disclosed in U.S. Pat. No. 4,098,001, one structure includes flexure means comprised of a number of discrete elements or radial members aligned with radii from a center which is the remote center of compliance of the device. The other structure includes flexure means composed of a number of discrete elements which are parallel to each other and which also have localized motion portions.

In another type of RCC as disclosed in U.S. Pat. No. 4,155,169, the two structures each include flexure means which are generally flexible or deformable throughout. In one of the structures the flexure means are radial members arranged along radii from a center or focus, and that center typically is not coincident with the remote center of compliance of the device. In the other structure a laterally oriented member also includes flexure means which establish a second center or focus. The remote center of compliance is typically somewhere between the two centers or foci and each of the structures contributes to the rotational and the translational action of this type of RCC. Thus in this latter type of RCC both structures constitute a rotational portion, whereas in the first mentioned type of RCC the radial member portion is identified with the rotational action.

In the third type of RCC device, U.S. patent application Ser. No. 140,768, "Deformable Remote Center Compliance Device", filed Apr. 16, 1980, Thomas L. De Fazio, at least a portion of the operator means or member is deformable and provides a first motion center. There is a deformable means for supporting the operator means or member to permit rotation about a projected second center and providing in conjunction with the operator member a remote center of compliance between the first and second centers at, near, or beyond the end of the operator member.

When neither the operator nor the part with which it is to be mated is chamfered or provided with a suitable guide or lead-in, the initial locating of the operator member and part is difficult. One existing technique uses sophisticated equipment to sense when the operator member and part have met e.g. the peg has fallen slightly into the hole. Either the operator member or part may be the "peg" and the other the "hole". When the peg is rocked side to side using sophisticated force sensing and feedback equipment until the peg is fully seated in the hole. This technique carries the peg, limply, at a slight angle in the search phase with a center of compliance well above the free end of the peg. The location of the center of compliance away from the free end aids in permitting the free end of the peg to tilt and drop into the hole.

SUMMARY OF INVENTION

It is therefore an object of this invention to provide a improved, simpler transferrable-center compliance system which enables an operator member to be suspended limply during a search phase but be erect and respond as an RCC device after the mating part is located.

It is a further object of this invention to provide an improved transferrable-center compliance system which has a remote center of compliance at, near or beyond the tip of an operator member, as provided by an RCC device, and may selectively shift its center of motion between the remote center of compliance and another center or centers defined or indeterminate.

It is a further object of this invention to provide such a system in which the motion of the operator member may occur selectively about either center or centers.

It is a further object of this invention to provide such a system in which the switching between centers may be accomplished simply, passively, and without complex control equipment.

It is a further object of this invention to provide such a system in which the switching between centers may be accomplished simply by varying the generally axially applied load.

This invention features a transferrable-center compliance system having a remote center compliance (RCC) device erectable by an axial load in a first range applied to an operator member, for establishing a first remote center of compliance at, near, or beyond the free end of the operator member. There is pliant support means for supporting the first RCC device when the first RCC device is collapsed by an axial load outside the first range applied to the operator member and for yielding to the first RCC device when it is erected with the first remote center of compliance, at, near, or beyond the free end of the operator member. Alternatively, the system may also include means for selectively erecting and collapsing the first RCC device to shift the center of motion of the system between the first remote center of compliance at, near, or beyond the free end of the operator member when the first RCC device is erected, and one or more other centers when the first RCC device is collapsed.

The invention also features a method of engaging the operator member of an RCC device with a mating member, including establishing a center of motion remote from the site of the remote center of compliance of the operator member to enable the operator member to be suspended limply and tilt relative to its normal axial axis. The operator member is then moved across the melting member until the tip of the operator member engages the receiving portion of the mating member, e.g. a hole. An axial force is then applied to erect the RCC device, deactivate the center of motion remote from the remote center of compliance, establish a remote center of compliance at, near or beyond the tip of the operator member, and complete the mating using the remote center of compliance of the RCC device.

In one embodiment the transferrable-center compliance system includes means interconnectable with an operator member for selectively establishing a first remote center of compliance at, near or beyond, the free end of the operator member, and a second center of motion spaced from the first remote center of compliance, toward, at, or beyond the other end of the operator member. The means for selectively establishing may include a first device including an RCC device for establishing the first remote center of compliance when the RCC device is active, and a second device for establishing the second center of motion when the second device is active and the RCC device is inactive. The second device is inactive when the RCC device is active. The first device may be activated by an axial load in a first range, and the second device may be activated by an axial load outside the first range. Alternatively, the system may include means for selectively activating the second device and de-activating the RCC device to establish the second center of compliance, and for activating the RCC device and de-activating the second device to establish the first center of compliance at, near or beyond the end of the operator member.

In preferred embodiments, the rotational portion of the RCC device in the first device may include a plurality of radial members which, when the RCC device is activated, extend radially from a focus. That focus may be coincident with the first remote center of compliance. The radial members may be filamentary, flexible, or generally rigid with major motion portions proximate each end. The second device may also include an RCC device that has radial members, which when that RCC device is activated extend radially from a focus, and that focus may be coincident with the center of compliance of that RCC device.

Alternatively, the second device may include a rotatable member and a support member for rotatably engaging and supporting the rotatable member when the second device is activated, and releasing the rotatable member when the second device is de-activated. There may be spring means for yieldably or loosely supporting the first device when the first device is de-activated. The operator member may be interconnected with the first device, the second device, or both devices. The RCC device used in the first device may include both a rotational and a translational portion, and the same may be true of a second RCC device used in the second device. The translational portions of an RCC device used in either the first or the second device, or both, may be activated and erected continuously and independently of whether the rotational portions of their respective RCC devices are themselves activated (erected) or de-activated (collapsed). The means for selectively activating may include locking means which activate one of the first or second devices and de-activates the other.

DISCLOSURE OF PREFERRED EMBODIMENT

Other objects, features and advantages will occur from the following description of a preferred embodiment and the accompanying drawings, in which.

The invention may be accomplished with a transferrable-center compliance system comprising a first remote center compliance (RCC) device erectable by an applied axial load in a first range. This establishes a first remote center of compliance at, near, or beyond the free end of the operator member. The RCC device may be of the types referred to supra, in U.S. Pat. No. 4,098,001, 4,155,169, or U.S. patent application Ser. No. 140,768, and the complete disclosures of those patents and the application are incorporated here by reference. The system further may include a pliant support means for supporting the first RCC device when the first RCC device is collapsed by an axial load outside the first range. The pliant support means also yields to the first RCC device when it is erected with the first remote center of compliance at, near, or beyond the free end of the operator member. In this way the ability of the pliant support means to yield to the RCC device permits the RCC device, when it is activated or erected, to operate freely and properly as an RCC device without interference. The pliant support means may establish its own second center of motion when the first RCC device is in the inactive or collapsed state. It may be a single defined center, one of a number of potential centers, or an indeterminate center or centers. The pliant support means functions to selectively enable the system to operate about the remote center of compliance of the RCC device, or not operate about that center, depending upon the conditions imposed.

Alternatively, the invention may be accomplished with a transferrable-center compliance system consisting of: means interconnectable with an operator member which selectively establishes a first remote center of compliance at, near or beyond the free end of the operator member and a second center of motion spaced from the first center of compliance toward or beyond the other end of the operator member. The means for establishing includes a first device including at least the rotational portion of an RCC device for establishing the first remote center of compliance and a second device for establishing the second center of motion. There are also means for selectively activating the RCC device and the second device for establishing the second center of motion. When the remote center compliance device is active, the second device is inactive; and when the second device is active the remote center compliance device is inactive.

The remote center compliance device may be activated by an applied axial force in a first range, the second device being inactive while the remote center compliance device is active. The second device may be activated by an applied axial force outside the first range which may include zero load, in such a manner that the remote center compliance device is concurrently inactivated. The operator member may be interconnected with the remote center compliance device, the second device for establishing a second center of compliance, or both. The RCC device may include only the rotational portion of a remote center compliance device, or it may include both the rotational and translational portions of such a device. In the U.S. Pat. No. 4,098,001 device the rotational portion is identified as the radial members; in the U.S. Pat. No. 4,155,169 RCC device the rotational portion includes both the radial members that emanate from a focus and the laterally oriented deformable portion. The radial members may include filamentary members, such as strings, cords or cables, springs or other flexible members, or they may be generally rigid with motion portions proximate their ends. The second device which establishes the second center of motion may also be an RCC device.

The means which establishes the two centers of compliance may also include locking means in order to selectively establish the center of compliance. That is, the locking means may act to lock one of the devices in the erected or activated state and the other in the deactivated state.

The transferrable-center compliance system herein disclosed includes means for establishing two centers of motion, the first located at, near or beyond the free end of an operator member which may be used in assembly operations, and the second spaced from the first in a direction towards the other end of the operator member. The first center is a center of compliance established by a remote center compliance device, or at least by the rotational portion of it, while the second center may be established by any type of device including a remote center compliance device. Only one of the two centers is active at any given time, and in a preferred embodiment means are included which selectively establish the two centers, along with means to selectively activate the means whereby the two centers are established.

According to the method of the invention, with the RCC device deactivated and the second device activated there is provided a center of motion which allows the operator member of the RCC device to be limply suspended and capable of tilting slightly so that its free end may be drawn along a workpiece until it falls into a hole on the workpiece. An axial force is then applied which deactivates the second center and activates the RCC device, enabling completion of the insertion utilizing the remote center of compliance of the RCC device.

Figure 1:
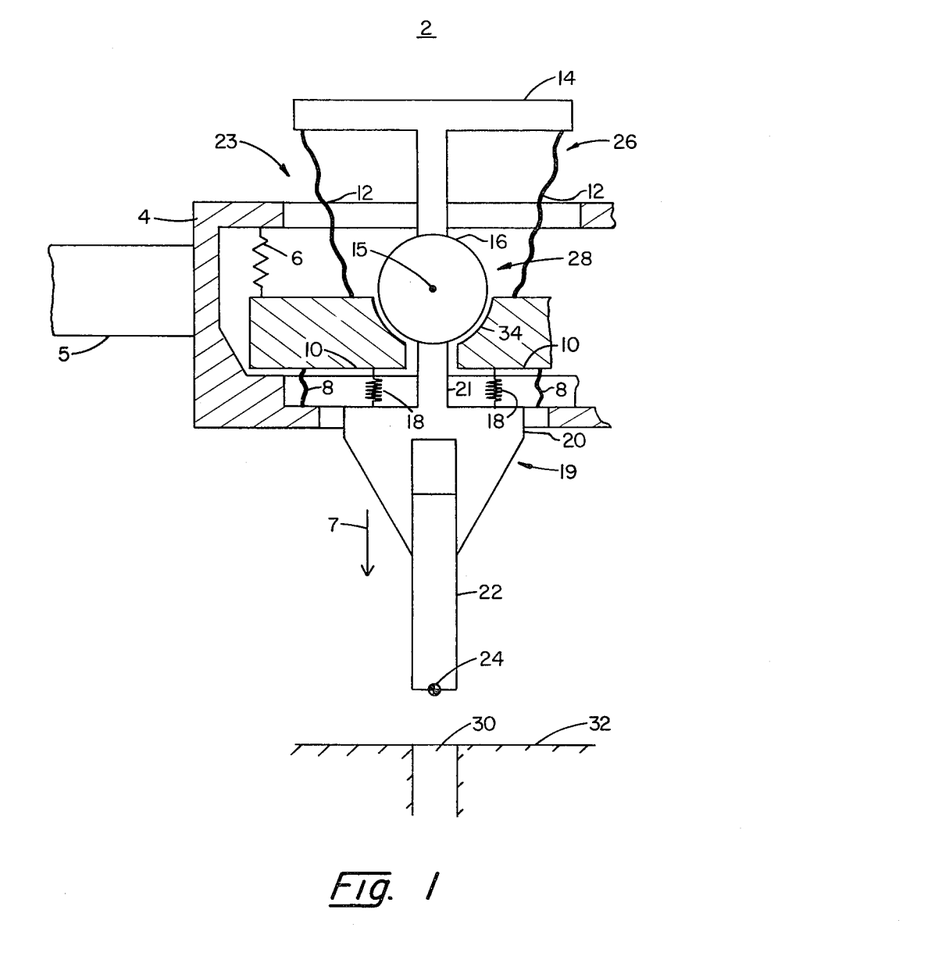
FIG. 1 is a diagrammatic sectional view of a transferrable-center compliance system according to this invention including a first device including an RCC device for establishing a first remote center of compliance and a second device including a spherical bearing and socket to establish a second center of motion.

There is shown in FIG. 1 a transferrable-center compliance system 2 according to this invention. Operator member 19 consists of gripper mechanism 20 attached to shaft 21. Operator member 19 is shown holding peg 22 which is to be assembled, i.e. inserted into, chamferless hole 30 in "block" or "part" 32. RCC device 26 establishes a first center of compliance 24 at, near or beyond the end of operator member 19; the center of compliance 24 is established only when remote center compliance device 26 is active or erected. A second pliant device 28 establishes a second center of motion spaced from the first center of compliance 24 toward the other end of member 19. The second center of motion 15, which is active only when the second device 28 is active, is located approximately coincident with the center of spherical bearing 16. Also shown in FIG. 1 are means 23 for selectively activating the RCC device 26 while concurrently de-activating the second device for producing a second center of motion 15, and for activating the second device 28 while concurrently de-activating RCC 26.

The RCC device 26 of FIG. 1 includes a rotational portion consisting of strings or flexible cables 12 and a translational portion consisting of strings or flexible cables 8. There is a plurality of radial elements 12, only two of which are shown in FIG. 1. There is also a plurality of translational elements 8, only two of which are shown. Typically, at least three such radial members 12 are included. The second device 28 for establishing second center of motion 15 includes spherical bearing 16 which mates with spherical seat 34 in intermediate member 10. The means 23 for selectively activating remote center compliance device 26 or second device 28 includes a support member 4, springs 6 and intermediate member 10. Additionally, FIG. 1 shows robot arm 5 to which the transferrable-center compliance 2 is attached and which directs the lateral (i.e. parallel to the surface of block or part 32) and vertical (i.e. perpendicular to the surface of block or part 32) motion of the transferrable-center compliance system 2. Upper support member 14 is attached to the upper ends of flexible cables 12. Member 14 is connected to spherical bearing 16, which is connected to rod 21.

In operation, robot arm 5 directs transferrable-center compliance system 2 over the surface of plate 32 searching for hole 30. During the search phase, the force applied is sufficiently low that the intermediate member 10 rests in mating seat 34. Soft springs 6 and 18 are thus extended. The strings or flexible cables 8 which constitute the translational portion of remote center compliance device 26 are limp, as are strings or cables 12 which constitute the rotational portion of device 26. Remote center compliance device 26 is thus deactivated, while the second device 28 which provides a second center of motion is active. The second center of motion under these conditions is approximately coincident with the center of spherical bearing 16. Operator member 19 with peg 22 attached is free to rotate about the second center 15 of compliance contained within spherical bearing 16. The robot arm 5 moves system 2 over the surface of block or part 32 searching for hole 30 with the end of peg 22 just touching the surface of block or part 32 and inclined at some slight angle to the vertical.

When the tip of peg 22 engages hole 30, the robot arm 5 applies a force to system 2 which pushes the peg 22 into the hole 30: an axial force is supplied to system 2. When a certain axial force threshold is exceeded, its value being determined by the mechanical properties of springs 6 and 18, intermediate member 10 is lifted from support piece 4 causing strings or flexible cables 8 to become taut, and spherical bearing 16 rises from its seat 34 causing strings or flexible cables 12 to become taut. Placing elements 12 and 8 in tension, i.e. making them taut, activates remote center compliance device 26, while raising spherical bearing 16 from seat 34 de-activates second device 28. With device 26 activated and device 28 de-activated, the center of compliance is shifted from a point within spherical bearing 16 to the point in space which is the focus of radial elements 12; the focus of these elements is the point in space at which the three straight lines determined by these elements intersect. See U.S. Pat. No. 4,098,001. Thus, for an applied axial force within a certain range, device 26 is active while device 28 is not; and, for an applied axial force outside this certain range device 28 is active while device 26 is not. Activation of remote center compliance device 26 and de-activation of second device 28 transfers the center of compliance from a point within spherical bearing 16 to a point 24 at the end of peg 22. Peg 22 is now free to rotate about remote compliance center 24 and translate parallel to itself in order to accomplish the assembly operation of inserting peg 22 into hole 30.

Figure 2:
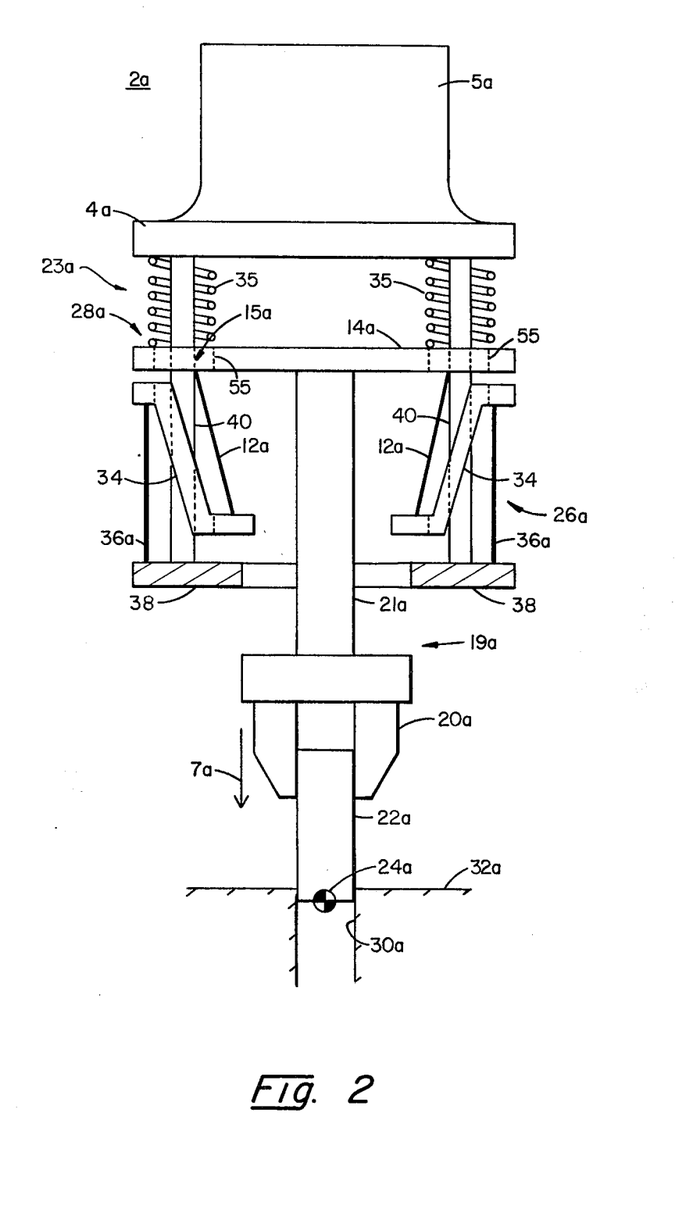
FIG. 2 is a diagrammatic sectional view of an alternative implementation of a transferrable-center compliance system according to this invention in which the second device includes spring means.

FIG. 2 provides a sectional view of an alternative implementation of a transferrable-center compliance system 20 according to this invention. Parts corresponding to those of FIG. 1 are given the same numerical designation with a lower case letter, a convention which is followed for subsequent figures. Robot arm 5a is attached to support plate 4a, from which protrude shafts 40 which are terminated at the lower end by plate 38. The system 2a includes a remote center compliance device 26a, a second pliant device 28a which has potentially a plurality of second centers of motion and means 23a for selectively activating either device 26a or device 28a in such a fashion that whenever one of the devices 26a and 28a is active the other is not. The second centers are represented symbolically at 15a, although location varies as a function, among other things, of the stiffness of springs 35. System 2a also includes a gripper mechanism 20a to grip the pin 22a to be inserted into chamferless hole 30a in part or block 32a.

Remote center compliance device 26a includes filamentary elements, strings or cables 36a attached at one end to member 34 and at the other end to plate 38, and strings or cables 12a attached at one end to member 34 and attached at the other end to plate 14a which is connected to the upper end of shaft 21a. Elements 12a constitute the rotational portion of an RCC device. The system 2a of FIG. 2 shows remote center compliance device 26a activated, whereas the system 2 of FIG. 1 shows corresponding device 26 de-activated. Second device 28a includes holes 55 in plate 14a through which pass shafts 40. Means 23a for selectively activating either device 26a or device 28a includes springs 35, shafts 40, plate 14a, and end plate 38.

When a sufficiently large axial force is exerted by robot arm 5a, that is, an axial force in a first range is applied to system 2a, elements 4a, 5a, 38, and 40 move down relative to part or block 32a. As a consequence flexible elements 12a and 36 are made taut, thereby activating remote center compliance device 26a. Note that only two of the elements 12a and 36 are shown in FIG. 2, while a plurality of such elements are included in device 26a. The focus of device 26a locates the remote center of compliance at a point in space at, near or beyond the free end of operator member 19a. In FIG. 2 this remote center is shown located at 24a at the end of peg 22a. When device 26a is thus activated the peg 22a, operator member 21a and top plate 14a are free to rotate about the point 24a, a condition which must be met in order to assemble peg 22a into hole 30a. Activation of device 26a by means 23a also includes making taut the flexible cables or strings 36; these members then constitute the translational part of remote center compliance device 26a and allow elements 22a, 19a and 14a to be translated (displaced parallel) to themselves.

When the applied axial force 7a falls outside the first range necessary to activate device 26a, second device 28a is activated while device 26a is simultaneously de-activated. In this case, elements 36 and 12a are limp, with member 34 resting on plate 38, top plate 14a resting on member 34, and springs 35 extended. Holes 55 in top plate 14a then permit limited motion of elements 22a, 19a, 21a and 14a about any one of an infinity of points. This infinity of points is represented by center 15a of second device 28a. During the search phase as robot arm 5a moves system 2a over part or block 32a searching for hole 30a, peg 22a is dragged across the surface of plate 32a with some slight inclination to the vertical, its center of rotation being proximate element 14a. When the peg 22a drops into hole 30a, robot arm 5a supplies an axial force 7a which activates remote center compliance system 26a as described above and concurrently de-activates second device 28a. With the remote center of compliance now established at the end of peg 22a, marked by 24a, the peg may be assembled, that is inserted, into hole 30a.

Figure 3:
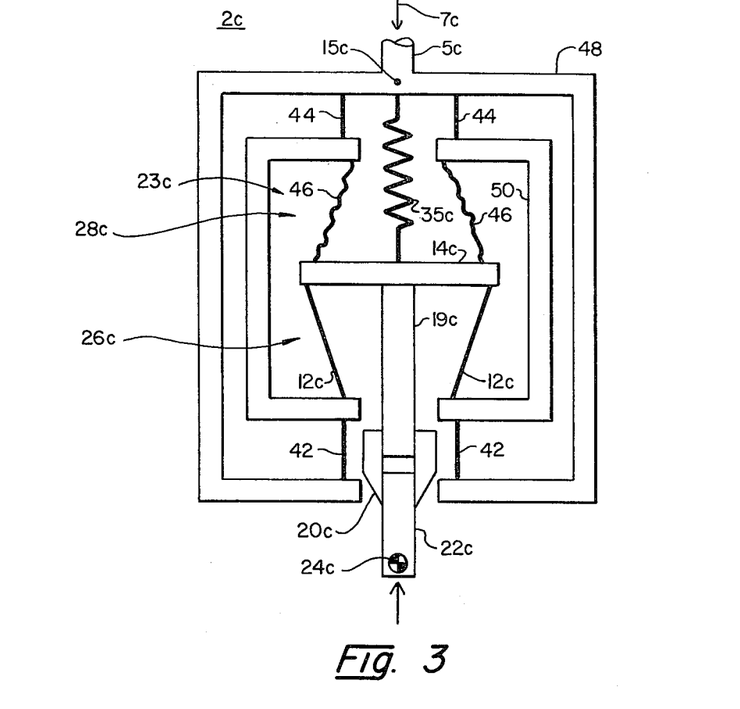
FIG. 3 is a diagrammatic sectional view of another transferrable-center compliance system according to this invention in which each of the first and second devices includes an RCC device.

FIG. 3 illustrates a transferrable-center compliance system 2c according to this invention, which unlike the system of FIGS. 1 and 2 includes two RCC devices for establishing two remote centers of compliance. System 2c includes robot arm 5c connected to frame 48, within which is supported an inner frame 50 by flexible elements 44 at the top and flexible elements 42 at the bottom. System 2c also includes RCC device 26c, RCC device 28c, and an operator member 19c and means 23c for selectively activating one or the other of devices 26c or 28c. The system of FIG. 3 shows operator member 19c interconnected with peg 22c by gripper mechanism 20c. RCC device 26c includes flexible elements which may be strings or flexible cables 12c, and flexible elements which may be strings or flexible cables 42 and 44. Elements 12c constitute the rotational part of remote center compliance device 26c, while flexible elements 42, 44, interconnected between inner frame 50 and outer frame 48 constitute the translational part of remote center compliance device 26c. Remote center compliance device 28c includes flexible elements 46, which may be strings or flexible cables, and act as the rotational portion, and flexible elements 42 and 44, which may be strings or flexible cables or rods, and act as the translational portion. Elements 42 and 44 remain always taut. Second device 28c includes spring means 35c interconnected with plate 14c at the top of shaft 21c.

The system of FIG. 3 shows remote center compliance device 26c erected or activated, while remote center compliance devie 28c is collapsed or deactivated. Device 26c is activated by application of an axial force 7c, which falls within a first axial force range to render flexible elements 12c taut, corresponding to positioning upper plate 14c at its uppermost position relative to inner frame 50. Under these conditions the focus of flexible elements 12c resides at, near or beyond the end of operator member 19c, in this case shown, at the end of peg 22c as marked by 24c. The translational portion of RCC device 26c formed by elements 42 and 44, is always active. When device 26c is activated by application of a suitable force 7c, RCC device 28c is de-activated by rendering flexible elements 46 limp and by compressing spring 35c interconnected between outer frame 48 and plate 14c. When the applied axial force 7c falls outside the first axial force range necessary for the activation of device 26c, device 28c becomes active and device 26c is de-activated. Under these conditions, plate 14c is in its lowermost position relative to inner frame 50, and flexible members 12c are limp while flexible members 46 are taut. The focus of radial flexible elements 46 locates a second remote center of compliance 15c above the first remote center of compliance 24c established by device 26c when it is activated.

Figure 4:
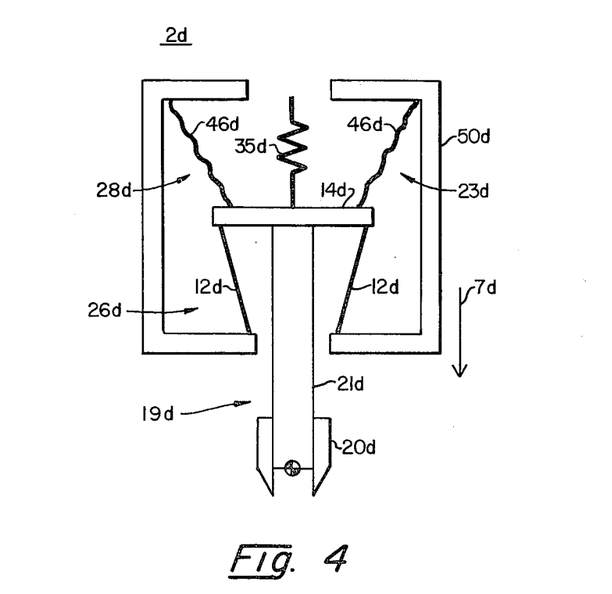
FIG. 4 is an alternative implementation of a system similar to that of FIG. 3.

FIG. 4 shows a transferrable center compliance system 2d according to this invention which is similar to the implementation of FIG. 3 with parts 42, 44, 48 and 5 omitted as redundant in view of FIG. 3. System 2d contains device 26d, device 28d, and operator means 19d. Device 26d, which is shown activated in FIG. 4, consists of flexible elements which may be flexible cables 12d, interconnected at the upper end with plate 14d and at the lower end with inner frame 50d. FIG. 4 shows device 26d activated while device 28d is de-activated. Activation of device 26d corresponds to rendering taut flexible elements 12d, while de-activation of device 28d corresponds to rendering limp flexible element 46d. When applied axial force 7d is in a first range, top plate 14d is positioned at its uppermost position relative to inner frame 50d, rendering elements 12d taut and elements 46d limp. The focus of elements 12d constitutes the point in space at which the remote center of compliance resides in the RCC's of the type shown in U.S. Pat. No. 4,098,001, typically at, near or beyond the end of operator means 19d. When the applied axial force 7d falls outside the first axial force range, plate 14d is positioned in its lowermost position relative to inner frame 50d, rendering element 12d limp and element 46d taut. Under these conditions device 28d is activated, while device 26d is de-activated. The focus of radial flexible elements 46d constitutes the point in space at which the second remote center of compliance is established in an RCC of the type shown in U.S. Pat. No. 4,098,001 typically at, near or beyond the end of the operator member which is nearer the top end of operator member 19d.

Figure 5:
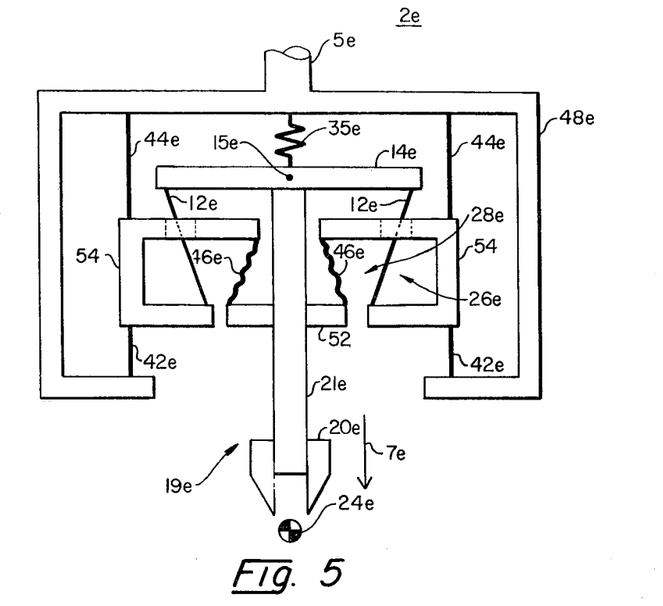
FIG. 5 is another alternative implementation of a system similar to that of FIG. 4.

FIG. 5 illustrates an alternative implementation of a transferrable-center compliance system 2e according to this invention, which includes robot arm 5e connected to an outer frame 48e, an RCC device 26e for establishing a first remote center of compliance at, near or beyond the end of operator means 19e, and a second RCC device 28e for establishing a second remote center of compliance spaced from the first remote center of compliance in a direction toward the other end of the operator member. RCC device 26e consists of flexible members 12e, which may be strings or flexible cables, interconnected at the top end with top plate 14e and at the bottom end with inner frame 54, and which when taut constitute the rotational portion of RCC device 26e. Remote center compliance device 26e also includes flexible elements 42e and 44e interconnected between inner frame 54 and outer frame 48e, which constitute the translational portions of RCC devices 26e and 28e. RCC device 28e includes flexible elements 46e interconnected at the upper end with inner frame 54 and at the bottom end with plate 52 and shaft 21e, and flexible elements 42e and 44e interconnecting inner frame 54 and outer frame 48. Flexible elements 46e constitute the rotational portion of RCC device 28e, while flexible elements 42e and 44e constitute the translational portion of device 28e. Spring means 35e may be interconnected with outer frame 48e and top plate 14e to support RCC device 26e in the collapsed or deactivated state. The system of FIG. 5 shows RCC device 26e erected or activated while RCC device 28e is de-activated. RCC device 26e is activated by rendering flexible elements 12e taut, in which case their focus at a point in space determines the position of the remote center of compliance 24e, which typically lies at, near or beyond the end of operator means 19e. Similarly, activation of RCC device 28e is accomplished by rendering flexible elements 46e taut, in which case the focus of radial elements 46e at a single point in space determines the location of a second center of compliance 15e spaced from the first remote center of compliance established by RCC device 26e. When an applied axial force 7e lies in a first range sufficient to activate remote center compliance device 26e, plate 14e is positioned in its uppermost position relative to outer frame 48e, rendering elements 12e taut and elements 46e limp. Thus RCC device 26e is activated while simultaneously RCC device 28e is de-activated. When the applied axial force 7e falls outside the first axial force range necessary to activate device 26e, upper plate 14e resides in its lowermost position relative to outer frame 48, thereby rendering elements 46e taut and elements 12e limp. Thus RCC device 26e is de-activated, while RCC device 28e is activated.

Figure 6:
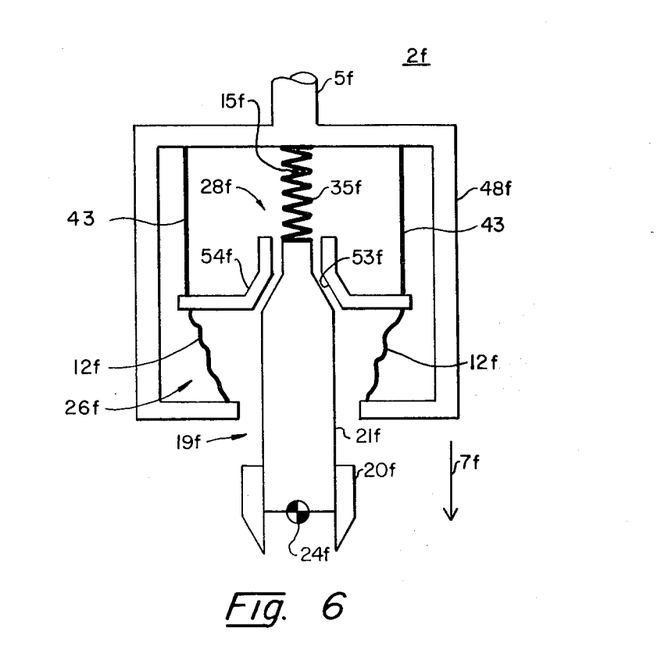
FIG. 6 is a diagrammatic sectional view of another transferrable-center compliance system according to this invention showing an alternative construction for the second device in which the second device is activated and the first device is de-activated.

FIG. 6 illustrates a transferrable center compliance system 2f according to this invention, which includes a robot arm 5f connected to an outer frame 48f, within which is contained an inner frame 54f. System 2f also includes a device 26f for establishing a remote center of compliance 24f at, near or beyond the end of operator means 19f; and a second pliant device 28f with an indeterminate center. Device 26f consists of flexible cables interconnected at the lower end with the outer frame 48f and at the upper end with inner frame 54f. Flexible members 12f constitute the rotational portion of device 26f. Device 26f also includes flexible support elements 43 interconnected at their lower ends with inner frame 54f and at the upper ends with outer frame 48f. Second device 28f includes tapered peg 21f in mating socket 53f in frame 54f. Spring means 35f is interconnected with outer frame 48 and the upper end of peg 21f. System 2f, FIG. 6, is shown with device 26f de-activated by rendering flexible members 12f limp, which corresponds to positioning inner frame 54f in its lowermost position relative to outer frame 48f. When an applied axial force 7f falls within a first range, inner frame 54f is forced to reside in its uppermost position relative to outer frame 48f, thereby rendering elements 12f taut and activating RCC device 26f. The focus of radial elements 12f when taut determines the point in space, typically at, near or beyond the end of operator means 19f, at which the remote center of compliance 24f is established. When the applied axial force 7f falls outside the range necessary to activate device 26f; device 28f becomes active and the center of compliance shifts to an indeterminate position. When device 28f is activated frame 54f resides in its lowermost position relative to outer frame 48, and spring means 35 permits the upper end of peg 21f to move freely relative to socket 53f.

Figure 7:
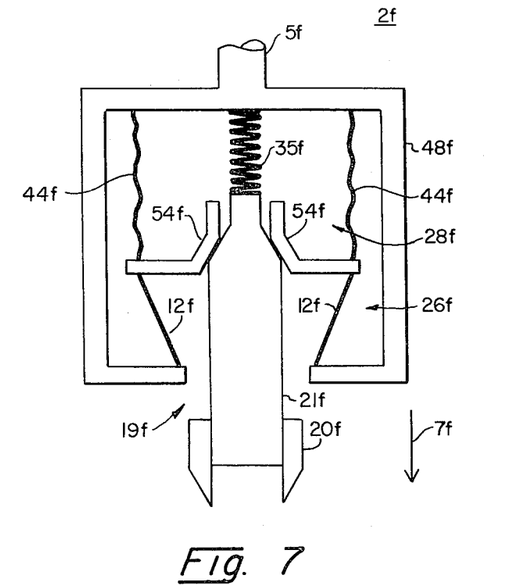
FIG. 7 is a view similar to that of FIG. 6 in which the first device is active and the second is not.
Figure 7A:
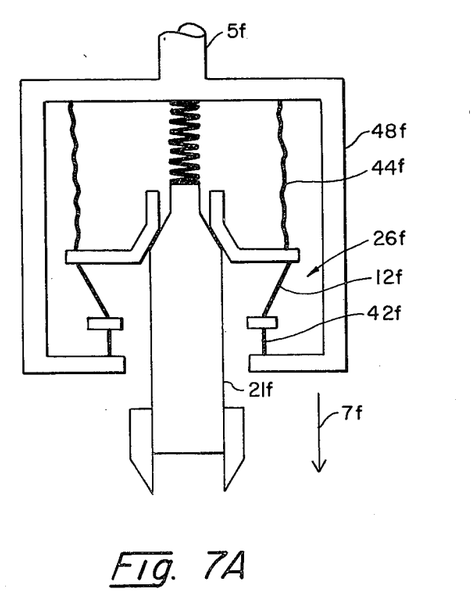
FIG. 7A is an alternative construction of the system of FIGS. 6 and 7 with translational elements added.

FIG. 7 illustrates the system of FIG. 6 in which device 26f has been activated, while simultaneously pliant device 28f has been de-activated. Elements 12f in FIG. 7 are now taut and constitute the rotational portion of RCC device 26f; device 28f is shown de-activated by having the upper end of peg 21f fitted snugly into or gripped by the mating socket in plate 54f, thereby compelling motion about center 24f. In FIG. 7A, device 26f is modified to include translational elements 42f.

Figure 8:
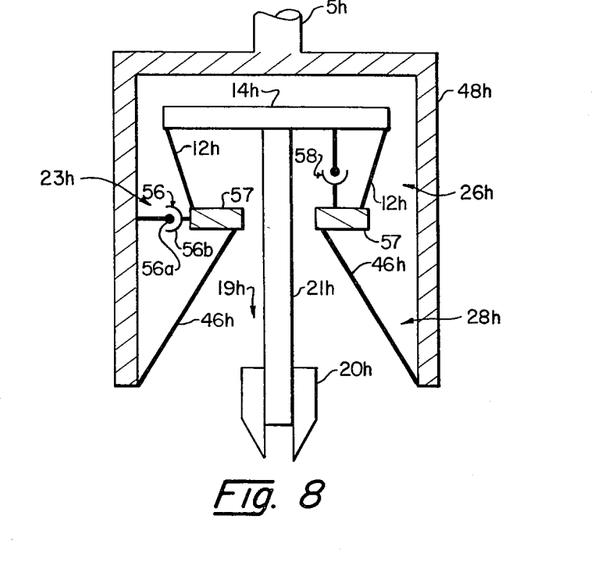
FIG. 8 is a diagrammatic sectional view of another transferrable-center compliance system according to this invention which includes a locking mechanism for selectively activating the first and second devices.

There is shown in FIG. 8 a transferrable center compliance system 2h according to this invention, which unlike the implementations of FIGS. 1-7 includes a locking mechanism 56, 58 for selectively activating one or the other of devices 26h and 28h. System 2h includes robot arm 5h connected to outer frame 48h, within which is contained members 14h and 57. System 2h also includes device 28h, device 26h, and operator member 19h supported at its upper end by member 14h. Device 26h includes flexible elements 12h which constitute the rotational part of device 26h. Device 28h includes flexible elements 46h which constitute the rotational part of device 28h. Flexible elements 12h are supported at the upper end by member 14h and at the lower end by member 57, while flexible elements 46h are supported at the upper end by member 57 at the lower end by outer frame 48h. The locking mechanism includes locks 56, 58, shown schematically in FIG. 8, which may be implemented in any suitable manner, e.g. mechanically, electromechanically, pneumatically, or hydraulically. Device 26h is activated by rendering taut elements 12h, whose focus is a point in space which determines the location of the center provided by device 26h. Similarly, device 28h is activated by rendering taut element 46h, whose focus is a point in space which determines the location of the center established by device 28h. Means 23h for selectively activating one or the other of devices 26h or 28h includes locking mechanisms 56, 58, and inner plate 57h. In order to activate device 26h, locking mechanism 58 interconnected between upper plate 14h and member 57 is engaged, while simultaneously, in order to de-activate device 28h, locking mechanism 57, including locks 56a and 56b, interconnected between outer frame 48h and member 57, is disengaged. When it is desired to activate device 26h, the locking mechanism 56 interconnected between outer frame 48h and member 57 is engaged, while simultaneously locking mechanism 56, interconnected between member 14h and member 57, is disengaged. In this manner, means 23h is capable of selectively activating one or the other of devices 26h and 28h.

Figure 9:
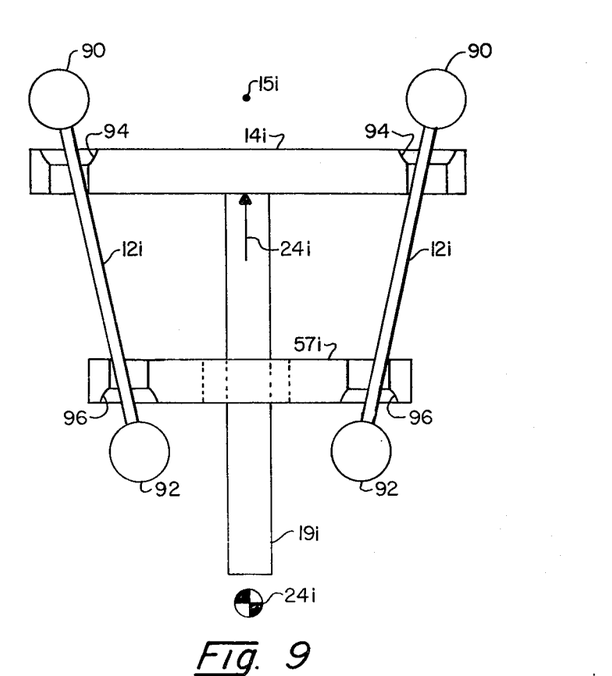
FIG. 9 is a diagrammatic sectional view of another transferrable-center compliance system in which the radial members are rigid with motion portions at their ends.
Figure 10:
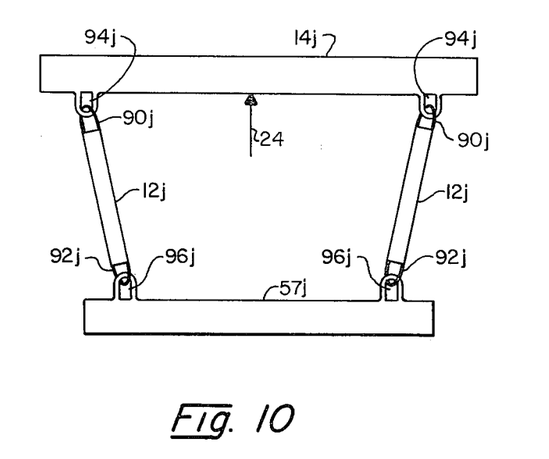
FIG. 10 is a diagrammatic sectional view of yet another transferrable-center compliance system in which the radial members are rigid with motion portions at their ends.

The radial elements included in the device may be stiff, as indicated by radial members 12i, FIG. 9, which include at either end some means such as balls 90, 92 which engage with hemispherical seats 94, 96 in members 14i and 57i. Thus with member 57i fixed, when sufficient axial force is applied through operator member 19i member 14i will be moved upwardly until balls 90 engage seats 94 and balls 92 engage seats 96, in which condition a center 24i is established. Alternatively, as shown in FIG. 10, the rigid members 12j may include at each end links 90j and 92j, which engage with holes 94j and 96j on members 14j and 57j, respectively.

Figure 11:
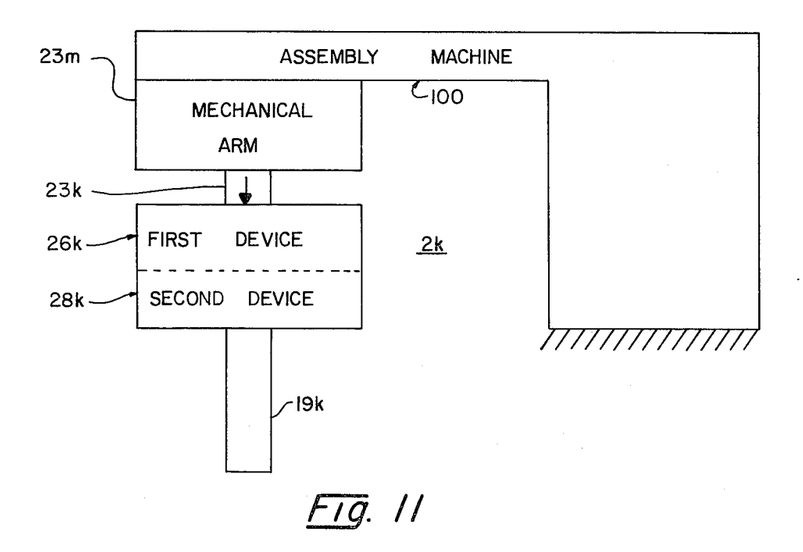
FIG. 11 is a block diagram of a transferrable-center compliance system according to this invention showing means for applying a force to the operator member.

The means for applying a force generally axially to operator member 19k and first and second devices 26k, 28k, FIG. 11, may include simply some means such as a portion of a frame 23k, by which force is applied to the entire system 2k, or may include a means for generating the force, such as a motor driven arm 23m or other portion of a robot machine or other motor device carried by assembly machine 100.

Figure 12A:
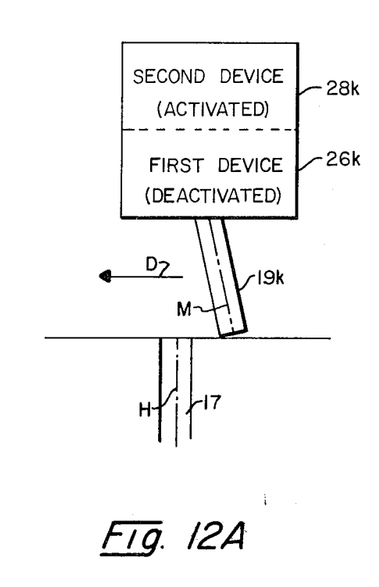
FIGS. 12A, B, and C illustrate the method of mating according to this invention.
Figure 12B:
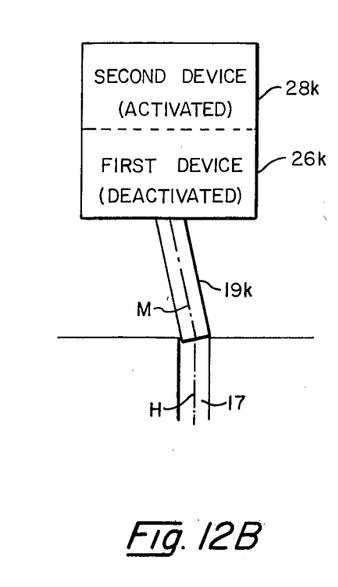
Figure 12C:
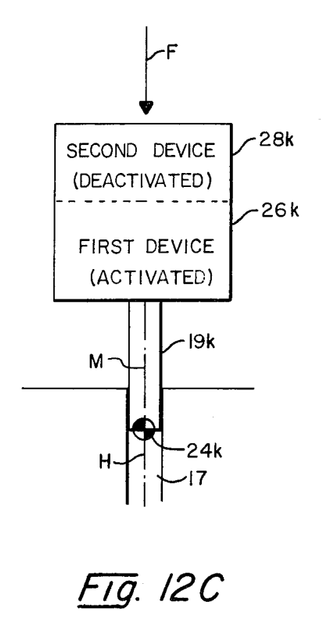

In operation, the method according to this invention is illustrated in FIGS. 12A, B, C. In FIG. 12A, with the first device 26k deactivated and second device 28k activated, operator member 19k hangs limply with its center of motion at a point determined by second device 28k. Member 19k is tilted slightly as it is drawn in the direction of arrow D toward hole 17: the axis M of member 19k is tilted with respect to its normal orientation, FIG. 12C, and the axis H of hole 17. First device 26k is an RCC device; the second device 28k may or may not be an RCC device. Continued motion in the direction of arrow D causes the tip of operator member 19k to drop into hole 17, FIG. 12B, which is the receiving portion that mates with member 19k. At this point an axial force F, FIG. 12C, is applied which deactivates the second device 28k and activates first device 26k, causing the RCC device to erect and establish a remote center of compliance at, near or beyond the tip of operator member 19k so that the insertion of operator member 19k into hole 17 is completed utilizing the remote center of compliance of RCC device 26k. It may sometimes be necessary to reverse direction slightly, i.e., to move opposite to arrow D in FIG. 12A, before or during application of the downward force, depending on the angle at which axis M is tilted.

Other embodiments will occur to those skilled in the art and are within the following claims:

What is claimed is:

1. A transferrable-center compliance system comprising:
    an operator member;
    a first remote center compliance (RCC) device including a frame and a plurality of radial members which are mounted and collapsible relative to said frame and which, in an erect condition relative to said frame, extend radially from a focus, for establishing a first remote center of compliance at, near, or beyond the free end of said operator member;
    pliant support means for supporting said first RCC device when said radial members are collapsed relative to said frame and yielding to said first RCC device when said radial members are erected relative to said frame with said first remote center of compliance at, near or beyond the free end of an operator member; and
    means for selectively erecting and collapsing said radial members relative to said frame, and thereby said first RCC device to shift the center of motion of the system between the first remote center of compliance at, near, or beyond the free end of an operator member when said first RCC device is erected and one or more other centers when said first RCC device is collapsed.

2. The transferrable-center compliance system of claim 1 in which said pliant support means includes a second RCC device, having a second remote center of compliance distinct from said first remote center of compliance.

3. The system of claim 1 in which said means for selectively activating includes means for applying a generally axial force to the operator member.

4. The system of claim 1 in which said focus is at said first remote center of compliance.

5. The system of claim 1 in which said radial members are filimentary.

6. The system of claim 1 in which said radial members are flexible.

7. The system of claim 1 in which said radial members are generally rigid with major motion portions proximate each end.

8. The system of claim 2 in which said second RCC device includes radial members which when said second RCC device is erected extend radially from a focus.

9. The system of claim 8 in which said focus is at said second remote center of compliance of said second RCC device.

10. The system of claim 8 in which said radial members are filimentary.

11. The system of claim 8 in which said radial members are flexible.

12. The system of claim 8 in which said radial members are generally rigid with major motion portions proximate each end.

13. The system of claim 1 in which said pliant support means includes a rotatable member and a support member for rotatably engaging and supporting said rotatable member when said first RCC device is collapsed and releasing said rotatable member when said first RCC device is erected.

14. The system of claim 1 in which said pliant support means includes spring means for yieldably supporting said first RCC device when said first RCC device is collapsed.

15. The system of claim 1 in which said pliant support means includes spring means for yieldably supporting the operator member when said first RCC device is collapsed and releasable gripping means for holding the operator member when said first RCC device is erected.

16. The system of claim 1 in which said means for selectively erecting includes locking means.

17. A transferrable-center compliance system comprising:
an operator member;
a first remote center compliance (RCC) device including a frame and a plurality of radial members which are mounted and collapsible relative to said frame and which, in an erect condition relative to said frame, extend radially from a focus, said radial members and therey said first RCC device being erectable by an applied axial load in a first range for establishing a first remote center of compliance at, near or beyond the free end of an operator member; and
pliant support means for supporting said first RCC device when said first RCC device is collapsed by an axial load outside said first range applied to the operator member, and for yielding to said first RCC device when it is erected with said first remote center of compliance at, near, or beyond the free end of the operator member.

18. The system of claim 17 further including means for applying a generally axial force to the operator member.

19. The system of claim 17 in which said focus is at said first remote center of compliance.

20. The system of claim 17 in which said radial members are filamentary.

21. The system of claim 17 in which said radial members are flexible.

22. The system of claim 17 in which said radial members are generally rigid with major motion portions proximate each end.

23. The system of claim 17 in which said pliant support means includes a second RCC device.

24. The system of claim 17 in which said pliant support means includes a rotatable member and a support member for rotatably engaging and supporting said rotatable member when said first RCC device is collapsed and releasing said rotatable member when said first RCC device is erected.

25. The system of claim 17 in which said pliant support means includes spring means for loosely supporting said first RCC device when said first RCC device is de-activated.

26. The system of claim 17 in which said pliant support means includes spring means for loosely supporting said operator member when said first RCC device is collapsed and releasable gripping means for holding the operator member when said first RCC device is erected.

27. A transferrable-center compliance system comprising:
an operator member;
means, interconnectable with said operator member, for selectively establishing a first remote center of compliance at, near, or beyond the free end of the operator member and a second center of compliance spaced from said first remote center of compliance toward, at, or beyond the other end of the operator member;
said means for selectively establishing including a first device comprising an RCC device including a frame and a plurality of radial members which are mounted and collapsible relative to said frame and which in an erect condition relative to said frame, extend radially from a focus for establishing said first remote center of compliance when said radial members are erected relative to said frame and said RCC device is thereby activated by an applied axial load in a first range and a second device for supporting said first RCC device when said radial members are collapsed relative to said frame for establishing said second center of compliance when said radial members are collapsed relative to said frame and said second device is thereby activated by an applied axial load outside said first range and said RCC device is inactive, said second device being inactive when said RCC device is active.

28. The system of claim 27 in which said focus is said first remote center of compliance.

29. The system of claim 27 in which said radial members are filamentary.

30. The system of claim 27 in which said radial members are flexible.

31. The system of claim 27 in which said radial members are generally rigid with major motion portions proximate each end.

32. The system of claim 27 in which said second device includes a second RCC device having radial members which when said second RCC device is activated extend radially from a focus.

33. The system of claim 27 in which said focus is at the remote center of compliance of said RCC device and coincides with said second center of compliance.

34. The system of claim 32 in which said radial members are filamentary.

35. The system of claim 32 in which said radial members are flexible.

36. The system of claim 32 in which said radial members are generally rigid with major motion portions proximate each end.

37. The system of claim 27 in which said second device includes a rotatable member and a support member or rotatably engaging and supporting said rotatable member when said second device is activated and releasing said rotatable member when said second device is de-activated.

38. The system of claim 27 in which said second device includes spring means for loosely supporting said first device when said first device is de-activated.

39. The system of claim 27 in which said second device includes spring means adapted for loosely supporting the operator member when said first device is de-activated and releasable gripping means adapted for holding the operator member when said first device is activated.

40. The system of claim 27 in which said means for selectively activating includes locking means for activating one of said first and second devices and de-activating the other.

41. A method of engaging the operator member of an RCC device having a frame and a plurality of radial members which are mounted and collapsible relative to said frame and which in an erected condition relative to said frame extend radially from a focus, with a mating member comprising:
collapsing said radial members relative to said frame to establish a center of motion remote from the site of the remote center of compliance of the operator member to enable the operator member to be suspended limply and tilt relative to its normal axial axis;
moving the operator member across the mating member until the tip of the operator member engages the receiving portion of the mating member; and
applying an axial force to erect said radial members relative to said frame, de-activate the center of motion remote from the remote center of compliance, establish a remote center of compliance at, near, or beyond the tip of the operator member and complete the mating using the remote center compliance of the RCC device.

42. A method of engaging the operator member of an RCC device having a frame and a plurality of radial members which are mounted and collapsible relative to said frame and which in an erected condition relative to said frame extend radially from a focus with a mating member comprising:
collapsing said radial members relative to said frame to establish a center of motion remote from the site of the remote center of compliance of the operator member to enable the operator member to be suspended limply and tilt relative to its normal axial axis;
moving the operator member across the mating member until the tip of the operator member engages the receiving portion of the mating member;
moving the operator member slightly in the opposite direction; and
applying an axial force to erect said radial members relative to said frame de-activate the center of motion remote from the remote center of compliance, establish a remote center of compliance at, near or beyond the tip of the operator member and complete the mating using the remote center compliance of the RCC device.

* * * * *